US009522748B2

(12) United States Patent
Chauvin et al.

(10) Patent No.: US 9,522,748 B2
(45) Date of Patent: Dec. 20, 2016

(54) APPARATUS FOR BLOWING AND FILLING A CONTAINER WITH LIQUID COLLECTING MEANS

(71) Applicant: NESTEC S.A., Vevey (CH)

(72) Inventors: Guillaume Chauvin, Monthureux sur Saone (FR); Damien Kannengiesser, Golbey (FR)

(73) Assignee: DISCMA AG, Hunenberg (CH)

( * ) Notice: Subject to any disclaimer, the term of this patent is extended or adjusted under 35 U.S.C. 154(b) by 852 days.

(21) Appl. No.: 13/743,908

(22) Filed: Jan. 17, 2013

(65) Prior Publication Data

US 2013/0180219 A1   Jul. 18, 2013

(30) Foreign Application Priority Data

Jan. 17, 2012   (EP) .................... 12151392

(51) Int. Cl.
*B65B 3/02* (2006.01)
*B29C 49/58* (2006.01)
(Continued)

(52) U.S. Cl.
CPC .......... *B65B 3/022* (2013.01); *B29C 49/4273* (2013.01); *B29C 49/46* (2013.01); *B29C 49/58* (2013.01);
(Continued)

(58) Field of Classification Search
CPC ............... B65B 3/022; B65B 2210/08; B67C 2003/2697; B67C 2003/26; B67C 2003/227; B67C 3/2608; B67C 3/005; B67C 3/001; B29C 2049/4694; B29C 2049/4664; B29C 2049/4655
(Continued)

(56) References Cited

U.S. PATENT DOCUMENTS 3,350,839 A * 11/1967 Carter ................. B67B 3/24
   53/510
3,519,705 A * 7/1970 Pannenbecker ......... B29C 49/38
   264/525
(Continued)

FOREIGN PATENT DOCUMENTS

DE   1800525 A1   5/1970
DE   2209494      9/1973
(Continued)

OTHER PUBLICATIONS

EPO machine translation EP1529620, retrieved Sep. 21, 2015, espacenet.com, 15 pages.*
(Continued)

*Primary Examiner* — Stephen F Gerrity

(74) *Attorney, Agent, or Firm* — Eric J. Sosenko; Jonathan P. O'Brien; Honigman Miller Schwartz and Cohn LLP

(57) ABSTRACT

An apparatus for blowing and filling a plastic container from a preform and using liquid as the blowing medium. The apparatus includes a mold encloses a preform so as to leave access to the mouth of the preform protruding from the upper surface of the mold. An injection head is provided for injecting a liquid into the preform and a liquid collecting member is provided for collecting any residual liquid present between the injection head and the neck of the blown and liquid filled container before opening the mold and/or moving the injection head away from the mold.

20 Claims, 2 Drawing Sheets

(51) Int. Cl.
 B29C 49/42 (2006.01)
 B29C 49/46 (2006.01)
(52) U.S. Cl.
 CPC ............... *B29C 2049/4664* (2013.01); *B29C 2049/5803* (2013.01)
(58) Field of Classification Search
 USPC ............... 53/561; 141/93, 115; 425/524
 See application file for complete search history.

(56) References Cited

U.S. PATENT DOCUMENTS

| | | | | |
|---|---|---|---|---|
| 3,792,724 A * | 2/1974 | Hunter | ............... | B67C 3/2608 141/115 |
| 3,827,214 A | 8/1974 | Naumann | | |
| 4,263,946 A * | 4/1981 | Smith | ............... | B67C 3/2608 141/117 |
| 5,054,272 A * | 10/1991 | Dundas | ............... | B29C 49/4802 425/525 |
| 5,226,863 A * | 7/1993 | Kimura | ............... | B65B 1/12 141/8 |
| 5,255,720 A * | 10/1993 | McPherson | ............ | B65B 39/00 141/115 |
| 5,756,155 A * | 5/1998 | Tzeng et al. | ............ | B05B 1/28 118/326 |
| 5,915,426 A * | 6/1999 | Gupte et al. | ............ | B67C 7/00 141/85 |
| 6,070,622 A * | 6/2000 | Rutter | ............ | B65B 39/004 141/10 |
| 8,714,964 B2 * | 5/2014 | Lisch et al. | ............ | B29C 49/58 425/524 |
| 2010/0021581 A1 | 1/2010 | Lemaistre | | |
| 2010/0303946 A1 * | 12/2010 | Voth | ............ | B29C 49/42 425/226 |
| 2013/0164404 A1 * | 6/2013 | Maki et al. | ............ | B29D 22/003 425/535 |

FOREIGN PATENT DOCUMENTS

| | | | | |
|---|---|---|---|---|
| EP | 1529620 A1 | 5/2005 | | |
| GB | 2002331 A * | 2/1979 | ............ | B67C 3/005 |
| JP | 56166029 A * | 12/1981 | ............ | B29D 23/03 |

OTHER PUBLICATIONS

EPO machine translation DE2209494, retrieved Sep. 21, 2015, espacenet.com, 7 pages.*
EPO machine translation DE1800525, retrieved Sep. 21, 2015, espacenet.com, 6 pages.*
U.S. Appl. No. 61/578,564, filed Dec. 21, 2011, 37 pages.*
European Search Report issued Jun. 19, 2012 for European Appln. No. 12151392, 1 page.

* cited by examiner

APPARATUS FOR BLOWING AND FILLING A CONTAINER WITH LIQUID COLLECTING MEANS

INCORPORATION BY REFERENCE

This application is based upon, and claims the benefit of priority from, corresponding European Patent Application No. 12151392.3 filed Jan. 17, 2012, the entire contents of which is incorporated herein by reference.

FIELD

The invention relates to an apparatus for blowing and filling containers from preforms.

BACKGROUND

Plastic containers such as bottles of water are manufactured and filled according to different methods including blow molding or stretch-blow molding.

According to one of these known methods a plastic preform is first manufactured through a molding process and then heated before being positioned inside a blowing mold.

The preform usually takes the form of a cylindrical tube closed at its bottom end and open at its opposite end.

Once the preform has been positioned within the mold only the open end of the preform is visible from above the mold.

A liquid injection head comprising an injection valve is brought into a sealing engagement with the upper surface of the mold around the open end of the preform.

The above-mentioned method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated a liquid is injected into the preform through its open end thanks to the injection head, as disclosed for instance in Applicant's patent EP 1 529 620 B1. Upon command, the injection valve is caused to be opened, thereby enabling flow of liquid therethrough and injection of liquid into the preform. This liquid injection causes expansion of the preform until coming into contact with the inner walls of the mold, thereby achieving the final shape of the bottle.

Once the bottle has been blown and filled with liquid, the injection valve is caused to be closed.

The Applicant has noticed that a certain amount of liquid (residual liquid) is still present in the space located between the closed injection valve and the bottle.

When the injection head is lifted up and/or the mold is opened to remove the blown and filled bottle residual liquid that has accumulated within the above-mentioned space splashes all around and, therefore, is wasted.

Also, liquid spreads all over the inner walls of the mold.

Liquid drops which are present on the mold inner walls have to be removed before accommodating a new preform inside the mold. Otherwise, the presence of liquid drops may impair defects in the outside surface of the next blown and filled container.

It is to be noted that the above situation also arises with other blow-molding methods and for other kinds of containers.

There is therefore a need for an apparatus remedying at least one of the above-mentioned drawbacks.

SUMMARY

In this respect, the invention is an apparatus for blowing and filling a plastic container from a preform and using a liquid as the blowing medium. The apparatus includes a liquid collecting member for collecting residual liquid that is present between the injection head and the neck of the blown and liquid filled container.

The residual liquid is the liquid overflow that remains around the neck of the container after it has been filled with liquid.

The invention makes provision for liquid collecting means which are suitable for collecting the residual liquid before opening the mold and/or raising the injection head. These means may be integrated into the apparatus.

According to a possible feature, the liquid collecting means are provided at least partially in the injection head and/or the mold.

Thus, the liquid collecting means may be integrated in whole or in part in the injection head or in the mold.

Alternatively, the liquid collecting means may be integrated in both the injection head and the mold so as to increase the efficiency of the liquid collecting operation.

According to a possible feature, the liquid collecting means comprise at least one collecting channel that is operable to be in communication with said residual liquid.

Such means are efficient by virtue of their simple conception.

According to possible feature, the liquid collecting means comprise a plurality of collecting channels that are operable to be in communication with said residual liquid.

According to the needs and/or the arrangement of the apparatus, a plurality of collecting channels may be envisaged rather than a single collecting channel.

It is to be noted that integrating the liquid collecting means in the injection head and/or the mold provides the advantage of having a compact apparatus with a reduced bulkiness.

For instance, the at least one collecting channel is a sucking channel.

Thus, the liquid is sucked in through the at least one sucking channel, e.g. thanks to a pump device located upstream said channel.

Alternatively, the liquid may be collected within the at least one collecting channel by gravity, which therefore does not necessitate using any sucking means. In this embodiment the at least one collecting channel is integrated in part in the mold and in the injection head.

According to another possible feature, the collecting channels are spatially arranged around the space that is located between the injection head and the neck of the blown and liquid-filled container.

Such an arrangement proves to be easy and quite efficient for getting access to the zone where the residual liquid to be collected is present.

According to another possible feature, the at least one collecting channel is inclined relative to a longitudinal axis passing by the centre of the neck of the blown and liquid-filled container.

The inclination of the at least one collecting channel is particularly useful when collecting the residual liquid through gravity.

According to a possible feature, the at least one collecting channel has two opposite ends of which one is in communication with the space that is located between the injection head and the neck of the blown and the liquid-filled container.

The possible inclination of the at least one collecting channel makes it easier to locate the communicating end of said channel in the lower part of the space that surrounds the neck of the container.

This advantage is obtained with liquid collecting channels provided in the injection head and/or the mold of the apparatus.

According to a possible feature, the liquid collecting means comprise at least one valve device that is able to prevent the residual liquid from being evacuated through said at least one collecting channel when in a closed position.

In an open position of said at least one valve device the residual liquid may be circulated through said at least one collecting channel either by sucking or gravity.

The at least one value valve device may be connected to the at least one collecting channel.

Said at least one valve device is located at the end of the channel which is opposite the end that is in communication with the space where the residual liquid is present.

According to a further possible feature, the at least one valve device is by default in a closed position that prevents liquid from being collected through said at least one collecting channel.

The role of the at least one closed valve device is to avoid any flow of liquid through the channel, for instance, when the liquid injection phase is operated and liquid collecting is not operated.

According to a possible feature, the number of collecting channels and/or their possible inclination relative to a longitudinal axis passing by the centre of the neck of the blown and liquid filled container and are adapted to the volume of the residual liquid to be collected.

In other words, the volume of the residual liquid to be collected depends on the space between the injection head and the neck of the container.

According to a possible feature, the injection head comprises a longitudinal body accommodating in a housing thereof an injection valve, the longitudinal body extending longitudinally beyond said housing through a body extension that surrounds an inner cavity facing the injection valve, the inner cavity accommodating the protruding neck of the container and the body extension comprising the at least one collecting channel.

The arrangement of the liquid collecting means within the body extension proves to be simple and efficient.

According to a possible feature, the end of the at least one collecting channel that is in communication with the space between the injection head and the neck of the container is in a lower position than the opposite end of said at least one collecting channel. Alternatively, the end communicating with the space is substantially at the same level as the opposite end.

Thus, the end of the at least one collecting channel in communication with the space where the residual liquid is present may be located at the basis or in the lower part of the space so as to increase the efficiency of the liquid collecting operation.

This feature is suitable for an embodiment where the liquid collecting means are provided in the injection head.

According to a possible feature, the at least one collecting channel is provided in part in the mold and in the injection head.

According to a possible feature, the at least one collecting channel has two parts one of which is provided in the mold and the other part in the injection head, said at least one collecting channel having an end that opens into the space located between the injection head and the neck of the blown and liquid-filled container.

Thus the part of the at least one collecting channel that is integrated within the injection head has the opening end.

According to a possible feature, the opening end of the at least one collecting channel is in an upper position than the opposite end of said at least one channel when the latter is partly provided in the mold and in the injection head.

This inclination makes it possible to favor the collection of liquid through the at least one collecting channel.

This arrangement is of particular interest when liquid collecting is to be carried out through gravity only.

According to a possible feature, the neck of the container has a neck ring at the basis thereof and the injection head is in a sealing engagement with the neck ring.

According to a possible feature, the opening end of the at least one collecting channel opens into a region of the injection head that is located close to the basis of the neck.

Such an arrangement makes it possible to locate the end of the at least one collecting channel as close as possible to the lower part of the space where the residual liquid is present. This arrangement enhances efficiency of the liquid collecting operation.

According to a possible feature, the mold comprises two halves, said at least one collecting channel being partially provided in at least one of the two mold halves.

For an increased efficiency, a plurality of collecting channels may be distributed into the two mold halves so as to more completely surround the above space with the residual liquid.

According to a possible feature, the apparatus comprises means for recycling the residual liquid that has been collected.

Thus, it is possible to recycle the collected liquid and, therefore, reduce or avoid waste of liquid in the process of blowing and liquid filling containers.

According to a possible feature, the apparatus comprises compressed air injection means for injecting compressed air into the space between the injection head and the neck of the blown and liquid filled container.

Such means are suitable, when activated, for cooperating with the liquid collecting means and help to collect the residual liquid that is present within the space around the container neck.

Thus, the efficiency of the liquid collecting operation is enhanced.

Additional features and advantages are described herein, and will be apparent from the following Detailed Description and the figures.

BRIEF DESCRIPTION OF THE FIGURES

Embodiments of the present invention will now be described, by way of example only, with reference to the accompanying figures in which.

DETAILED DESCRIPTION

Figure 1:
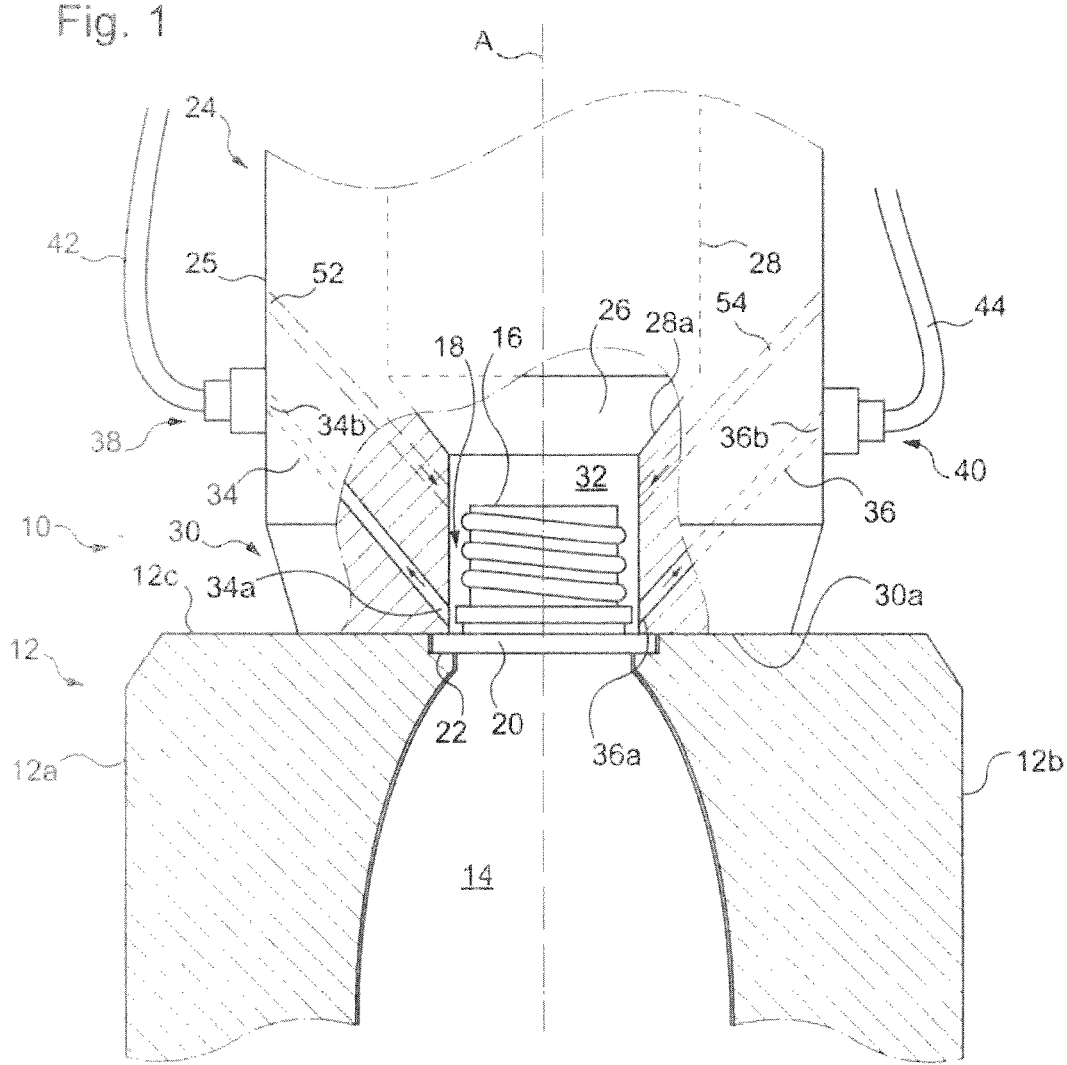
FIG. 1 is a schematic and partial view of an apparatus for blowing and filling a container according to a first embodiment.

FIG. 1 is a schematic and partial view illustrating the main components of an apparatus 10 for blowing and filling a container according to a first embodiment.

The apparatus 10 comprises a mold 12 enclosing a container 14 such as a bottle. Mold 12 comprises two mold halves 12a and 12b that are operable to move apart in order to extract container 14. The mold may comprise more than two parts and for instance a base on which rests the container.

A bottle which has been manufactured through blow molding or stretch-blow molding comprises a dispensing opening 16 having a neck 18 with an outside thread and a flange or neck ring 20 that is provided at the basis of the neck.

As represented in FIG. 1, a longitudinal axis A which here coincides with the vertical axis, passes by the centre of dispensing opening 16.

It is to be noted that axis A is a symmetry axis to container 14.

The container has been shaped so that the dispensing opening 16 protrudes from the upper surface 12c of mold 12 above the latter.

In particular, neck ring 20 rests against a peripheral inner shoulder 22 provided at the upper part of the mold around the container 14.

Apparatus 10 also comprises an injection head 24 which comes into sealing engagement (liquid-tight engagement) with the upper surface 12c of mold 12 before the beginning of the blowing and filling method and, in the course of operation thereof. Injection head 24 is also in a sealing engagement with container 14, more particularly with neck ring 20.

Injection head 24 comprises a longitudinal body 25 and an injection valve 26 provided in an inner housing 28 of said longitudinal body.

Injection head 24 is substantially cylindrical in shape as partially illustrated in FIG. 1 and inner housing 28 is also cylindrical in shape and both are coaxial.

Injection head 24 and mold 12 are substantially aligned along longitudinal axis A.

As represented in FIG. 1, body 25 further extends longitudinally along longitudinal axis A through a longitudinal body 30 that extends beyond housing 28 and injection valve 26.

Body extension 30 is substantially annular in shape and, for example, takes the form of a cylindrically-shaped extending wall with a frusto-conical shape on part of its outside surface.

Body extension 30 surrounds an inner cavity 32 which faces housing 28 and injection valve 26. Inner cavity 32 accommodates the protruding neck 18 of container 14 which is engaged thereinto.

Body extension 30 has a free end 30a which comprises a sealing or liquid-tight end surface, perpendicular to axis A and which is in sealing engagement with upper surface 12c and neck ring 20.

FIG. 1 apparatus 10 also includes liquid collecting means for collecting the residual liquid that is present inside cavity 32, after blowing and liquid filling of container 14 as will be explained subsequently.

In the present embodiment liquid collecting means are provided in injection head 24.

Liquid collecting means comprise a plurality of liquid collecting channels two of which, 34 and 36, are represented in FIG. 1.

These channels are spatially arranged, e.g. regularly, around inner cavity or space 32 and, more particularly, are integrated into body extension 30.

As represented in FIG. 1, each channel has two opposite ends 34a and 34b, 36a and 36b. A first end 34a, 36a opens into inner cavity 32 so as to be in communication therewith while the opposite second end 34b, 36b opens onto the outside surface of body 25.

Each channel is inclined relative to longitudinal axis A so that the first end 34a, 36a is in a lower position than the opposite second end 34b, 36b.

The apparatus further comprises valve devices 38, 40 that are located facing the opposite ends 34b, 36b respectively and connected thereto.

These valve devices which are for example in a corresponding number with the collecting channels are by default in a closed state which prevents any flow of liquid therethrough.

Arranging the valve devices outside the injection head does not question the conception thereof and proves to be easy and cheap to implement.

Figure 2:
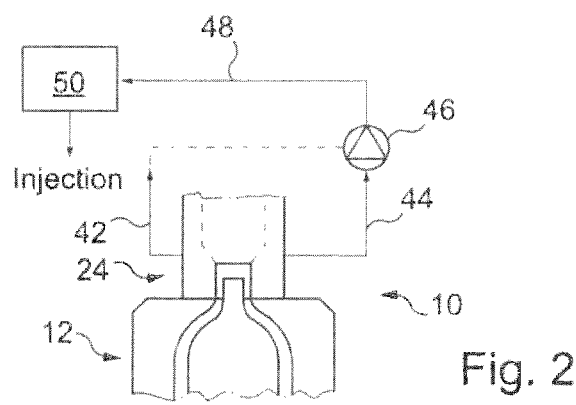
FIG. 2 is schematic view of a liquid circuit system in connection with the injection head of FIG. 1 apparatus.

As represented in FIGS. 1 and 2, apparatus 10 comprises pipes or ducts 42, 44 that respectively connect each channel 34, 36 to a pump device 46. Pump device 46 is, in turn, connected through a connecting duct or pipe 48 to a tank or reservoir of liquid 50 that will be used for supplying liquid during the next liquid injection phase. It is to be noted that pipes or ducts 42 and 44 are part of liquid collecting means.

Alternatively, the members 38 and 40 which are connected to the collecting channels may be connectors and the valve devices (not represented in the drawing) may be located upstream said connectors on the respective pipes or ducts 42, 44.

It is to be noted that the number of collecting channels may vary and, for example, be greater than two or even equal to one.

Also, the angle of inclination of the channels may vary as well as their shape.

Typically, the number of channels and their inclination depend on the volume of liquid to be collected. This amount of liquid may be assessed based on the volume of the space surrounding the container neck 18 within cavity 32.

The inclination of the channel(s) relative to a plane that is perpendicular to axis A may be relatively small or even null provided that:

the opening end (34a, 36a) is located in the lower part of cavity 32 (close to neck ring 20), the space around the opposite end (34b, 36b) is sufficient for arranging a valve device or a connector in contact with said opposite end.

For example, a channel may have a substantially cylindrical hollow shape.

In the present embodiment two to six channels for example four channels, are arranged within body extension 30 around cavity 32. Each channel has an inner diameter lying between 2 and 8 mm and, for example, being equal to 4 mm.

The angle of inclination of each channel relative to an horizontal plane lies between 5 and 60°.

In order to reduce the bulkiness of the channel arrangement within the injection head the angle of inclination may preferably be between 5 and 30°.

This second range of inclination angles also makes the liquid collecting easier.

Alternatively, other shapes of channels may be envisaged.

For example, a single channel may be provided around the whole circumference of body extension 30 (viewed in a transverse cross-section that is perpendicular to FIG. 1 plane) with the same longitudinal cross-section as that of FIG. 1 or with another cross-sectional shape. Thus, the single channel may have an overall frusto-conical shape.

Alternatively, angularly extended and separated portions of channels may be spatially arranged around the circumference of body extension 30.

In this embodiment container 14 is a plastic container which has been manufactured according to a known method such as disclosed in Applicant's patent EP 1 529 620 B1.

According to this method, a plastic preform is first manufactured through a molding process and then heated before being positioned within mold 12.

The preform usually assumes the shape of a cylindrical tube closed at its bottom end and open at its opposite end.

Once the preform has been positioned within the mold only the open end of preform is visible from above the mold. The open end is engaged within cavity 32.

The open end is shaped during the process, thereby leading to dispensing opening 16.

The blowing and filling process makes use of a stretch rod (this rod is not represented in the drawing but traverses the injection valve 26) which is downwardly engaged into the open end of the preform so as to come into contact with the closed bottom end thereof. The stretch rod is then further actuated to push the closed end downwardly and stretch the preform accordingly in a controlled manner.

After the stretching phase has been initiated the liquid mentioned above (e.g. water) is injected into the preform through its open end around the stretch rod, while the latter is still being actuated. For liquid injection purpose injection valve 26 is placed in an upper position away from the inner surface 28a so as to enable flow of liquid between valve 26 and surface 28a. Valve devices 38 and 40 are closed.

This liquid injection causes expansion of the preform together with the movement of the stretch rod until coming into contact with the inner walls of the mold.

The final shape of the container is thus achieved.

Once container 14 has been blown and filled with liquid, injection valve 26 is commanded to be lowered against inner surface 28a (position of FIG. 1) in a sealing engagement therewith, so as to prevent any further flow of liquid into container 14 and ensure liquid-tight sealing.

The inner cavity 32 contains residual liquid that is located around neck 18 and represents an overflow that has not been injected into container 14 following the liquid injection phase. When the channels are inclined, the residual liquid remains within cavity 32 and does not fill the channels.

In order to avoid such a liquid overflow to be wasted when moving the injection head away from the mold and opening the latter the liquid collecting channels act as sucking channels. Valve devices 38 and 40 are commanded to be opened and pump device 46 is commanded to operate and causes, by depression, the liquid overflow (residual liquid) to rise up inside sucking channels and pipes 42 and 44.

The overflow extracted in this way is then supplied to tank 50. The recovered or collected liquid overflow is then stored within a view to being recycled in the course of the next liquid injection phase.

As schematically illustrated in dotted lines in FIG. 1, optional means for injecting compressed air within cavity 32 are provided. When being activated such injected compressed air pushes the residual liquid into the collecting channels (when liquid collecting is operated) and, therefore, contribute to collecting the residual liquid. This contributes to increasing the efficiency of the liquid collecting operation and reducing the cycle time of the process.

These injection means may cooperate with liquid collecting channels which operate under the action of a sucking device, e.g. a pump device.

Alternatively, these injection means may be used when the liquid collecting channels are less, or even not, inclined relative to an horizontal plane and no sucking device is used. The only power used for evacuating the residual liquid through the collecting channels is that supplied by the compressed air emerging into the cavity 32 and expelling the liquid into said channels.

It is to be noted that the injection means may take the form of channels such as channels 52 and 54 which bring compressed air down to cavity 32 from a source of compressed air that is not represented in the drawing for the sake of clarity.

These channels may be inclined relative to axis A and, e.g. have the same inclination or same arrangement with no inclination as that of channels 34 and 36 for easiness of manufacturing.

The outlet end of each channel may be located at any place along the height of cavity 32.

Figure 3:
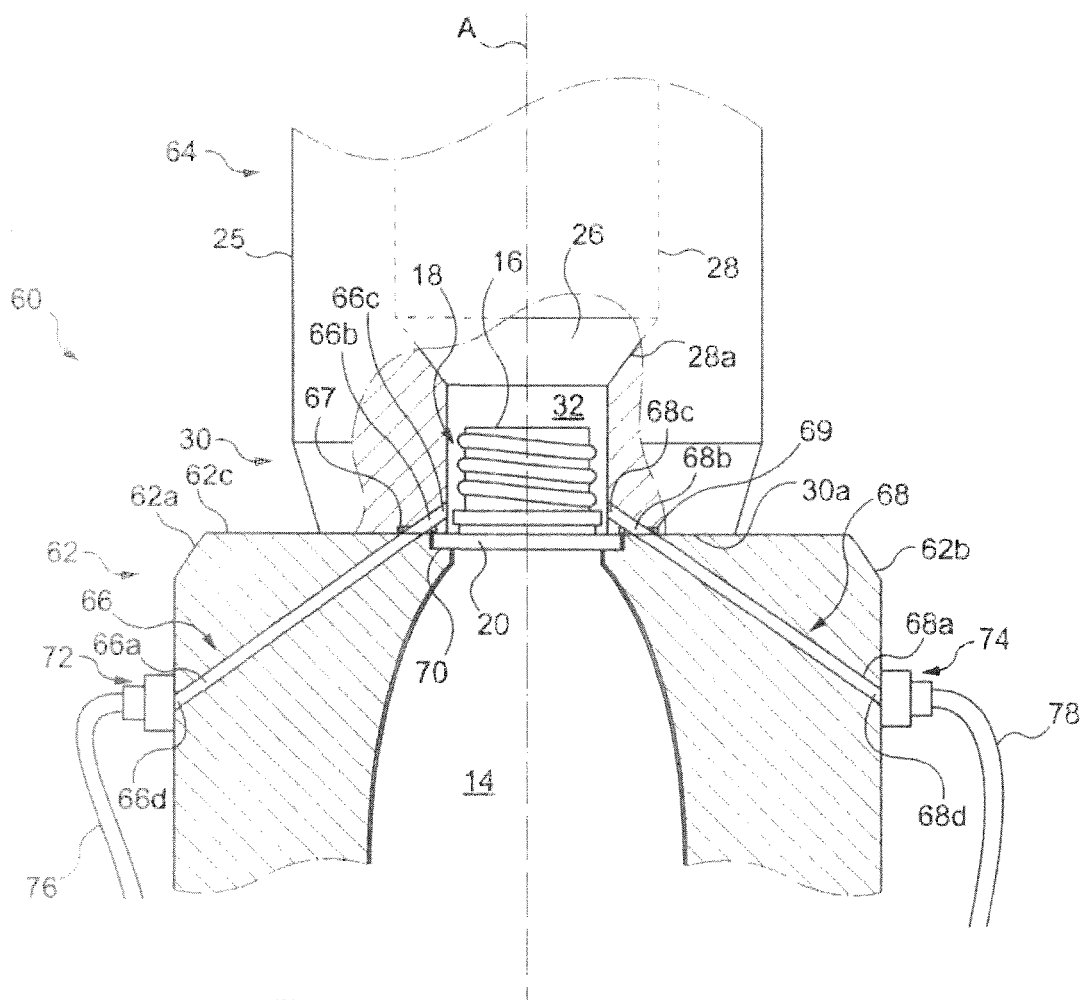
FIG. 3 is a schematic and partial view of an apparatus for blowing and filling a container according to a second embodiment.

FIG. 3 illustrates a second embodiment of an apparatus for blowing and liquid filling containers.

As represented in FIG. 3, an apparatus 60 for blowing and filling a container 14 comprises a mold 62 and an injection head 64.

Injection head 64 is almost the same as injection head 24 except that it does not contain collecting channels 34 and 36 and their associated components (valve devices, pipes, etc.).

Mold 62 is almost identical to mold 12 in that it comprises two mold halves 62a and 62b enclosing container 14.

Neck 18 of container 14 protrudes from the upper surface 62c of the mold and penetrates into inner cavity 32 of injection head 64.

The free end 30a of injection head 64 is in sealing engagement with upper surface 62c and neck ring 20.

As represented in FIG. 3, the apparatus comprises liquid collecting means which are provided both in mold 62 and injection head 64.

More particularly, liquid collecting means comprise a plurality of inclined liquid collecting channels two of which, 66 and 68, are represented in FIG. 3.

The plurality of channels are integrated into the two mold halves and the injection head. For example, they are arranged with a regular spatial spacing viewed in a transverse cross-section relative to axis A.

Each channel has two channel parts which are aligned with each other, one channel part being provided in one mold half and the other channel part in the injection head.

Thus, channel 66 (resp. 68) comprises a first part 66a (resp. 68a) integrated within mold half 62a (resp. 62b) and a second part 66b (resp. 68b) integrated within body extension 30.

Liquid-tight means are provided around the joint surface between the two channel parts 66a, 66b (resp. 68a, 68b) in order to prevent any leak of liquid. For instance, a toroidal gasket seal 67, 69 is arranged in the injection head around the joint surface of channel 66, 68 respectively.

Each channel 66, 68 has two opposite ends 66c and 66d, 68c and 68d.

One of the two opposite ends 66c, 68c (inlet) is in an upper position than the opposite end 66d, 68d (outlet) and emerges into the upper surface 62c of the mold.

As represented in FIG. 3, the emerging end 66c, 68c of each collecting channel is located in the region of the cavity 32 that surrounds the neck 18 and, more particularly, in the lower part thereof.

As shown in FIG. 3, the emerging ends are located at the basis of the neck 18 and above the neck ring 20.

Neck ring 20 rests against a peripheral inner shoulder 70 provided at the upper part of the mold around container 14.

As for FIG. 1 collecting channels 34 and 36, collecting channels 66 and 68 are inclined relative to longitudinal axis A.

As for the FIG. 1 embodiment, the number of collecting channels, their angle of inclination as well as their shape may vary depending on the amount of residual liquid present within inner cavity 32. The same remarks as those provided above relative to the first embodiment also apply here and will not be repeated.

In FIG. 3 embodiment two to six channels, for example four channels, may be distributed all around cavity 32 both in the mold halves and body extension 30.

Each channel has an inner diameter which lies between 4 and 8 mm and, for example, is equal to 6 mm. This range of values is greater than that of FIG. 1 embodiment so as to be more adapted when gravity liquid collecting is used. However, if compressed air is injected into cavity 32 the inner diameter of the channels may be the same as for FIG. 1 channels.

Furthermore, the angle of inclination of each two-part channel is smaller than that of the FIG. 1 channels in order to avoid any interference between the part of the channel located in the mold half and the shape of the container (profile of the inner walls of each mold half).

Thus, the angle of inclination of each two-part channel relative to an horizontal plane lies between 5 and 45° and, for instance, is equal to 30°.

The apparatus further comprises valve devices 72, 74 which are respectively located facing outlets 66b, 68b of collecting channels 66 and 68 and are connected thereto. These valve devices are closed by default.

Ducts or pipes 76, 78 are respectively connected to valve devices 72 and 74 at one end and to pump device 46 of FIG. 2 at the opposite end.

The same remarks as those made in relation to valve devices 38 and 40 in FIG. 1 apply here and will not be repeated.

The liquid collecting and recycling means represented in FIG. 2 (liquid circuit system) may also be used in conjunction with FIG. 3 embodiment.

Once container 14 has been blown and liquid-filled, injection valve 26 is commanded to be lowered against inner surface 28a (position of FIG. 3), in a sealing engagement therewith so as to prevent any further flow of liquid into container 14 and ensure liquid-tight sealing.

The residual liquid or liquid overflow that is located within cavity 32 around neck 18 following the liquid injection phase is collected through liquid collecting channels 66 and 68.

These collecting channels behave as sucking channels when valve devices 72 and 74 are commanded to be opened and pump device 46 of FIG. 3 is commanded to operate by causing depression in the upstream circuit.

This will then cause the liquid overflow to be sucked into channels 66 and 68 and pipes 76 and 78 until reaching pump device 46.

The collected residual liquid is then supplied by pump device 46 to tank 50 for being stored before any recycling.

Since a pump device is used in this embodiment the angle of inclination of the channels may be much smaller than 30° relative to the horizontal plane, e.g. in the order of several degrees.

According to an alternative embodiment, no pump device is necessary for collecting the liquid. As the collecting channels 66 and 68 are inclined relative to axis A with the outlet ends located in a lower position than the inlet ends 66c, 68c, the liquid may be collected by gravity inside the channels when valve devices 72 and 74 are caused to be opened and venting to the atmosphere is performed.

The collected liquid may then be further conveyed by gravity to a tank or reservoir as tank 50 of FIG. 2 for subsequently recycling the liquid during another injection phase.

It is to be noted that valve devices are present in the liquid circuit in order to prevent any gravitational flowing of liquid into the collecting channels during the liquid injection phase.

As for FIG. 1 embodiment compressed air injection means may be used in connection with FIG. 3 embodiment.

According to a first variant embodiment, compressed air may be used with FIG. 3 embodiment in which a pump device is involved to extract the residual liquid so as to enhance the efficiency of the liquid collecting operation.

According to a second variant embodiment, compressed air may be used with FIG. 3 embodiment in which the residual liquid is collected through the collecting channels thanks to gravity. This dramatically reduces the time necessary for collecting the liquid and therefore the cycle time of the whole process.

All that has been described above in connection with FIG. 1 embodiment still applies here and will not be repeated.

Thanks to liquid collecting means waste of liquid is dramatically reduced in the course of performance of the blowing and filling method.

Furthermore, the presence of liquid drops within the mold and, in particular, on the inner surface of the walls of the two mold halves is dramatically reduced or even avoided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. Apparatus for blowing and filling a plastic container from a preform using a liquid as a blowing and filling medium, the preform being a cylindrical tube closed at one end and open at an opposing end defining a mouth with a dispensing opening, the apparatus comprising:
    a mold for enclosing the preform so as to leave access to the mouth and a neck of the preform that protrudes from an upper surface of the mold;
    an injection head configured to inject a liquid into the preform, the injection head being in sealing engagement with the upper surface of the mold around the mouth of the preform and excluding sealing engagement with the dispensing opening of the mouth of the preform; and
    a liquid collecting member defining a cavity surrounding the neck of the preform and configured to collect residual liquid that is present in the cavity between the injection head and the neck of the blown and liquid filled container, the liquid collecting member being suitable for collecting the residual liquid before opening of the mold and/or moving away the injection head from the mold.

2. Apparatus according to claim 1, wherein the liquid collecting member is provided at least partially in the injection head and/or the mold.

3. Apparatus according to claim 1, wherein the liquid collecting member comprises at least one collecting channel that is operable to be in communication with the residual liquid.

4. Apparatus according to claim 3, wherein the at least one collecting channel further comprises collecting channels spatially arranged around the cavity that is located between the injection head and the neck of the blown and liquid-filled container.

5. Apparatus according to claim 3, wherein the at least one collecting channel has two opposite ends of which one is in communication with the cavity that is located between the injection head and the neck of the blown and liquid-filled container.

6. Apparatus according to claim 5, wherein the end of the at least one collecting channel that is in communication with the cavity between the injection head and the neck of the container is in a lower position than the opposite end of the at least one collecting channel.

7. Apparatus according to claim 3, wherein the liquid collecting member comprises at least one valve device.

8. Apparatus according to claim 7, wherein the at least one valve device is by default in a closed position that prevents liquid from being collected through the at least one collecting channel.

9. Apparatus according to claim 3, wherein the injection head comprises a longitudinal body accommodating in a housing thereof an injection valve, the longitudinal body extending longitudinally beyond the housing through a body extension that surrounds an inner cavity facing the injection valve, the inner cavity accommodating the protruding neck of the container and the body extension comprising the at least one collecting channel.

10. Apparatus according to claim 1, wherein the neck of the container has a neck ring at a base thereof and the injection head is in a sealing engagement with the neck ring.

11. Apparatus according to claim 1, wherein an open end of at least one collecting channel opens into a region of the injection head that is located close to a base of the neck of the container.

12. Apparatus according to claim 1, further comprising a member for recycling the residual liquid that has been collected.

13. Apparatus according to claim 1, further comprising a compressed air injector for injecting compressed air into the cavity between the injection head and the neck of the blown and liquid filled container.

14. An apparatus for blowing and filling a plastic container from a preform using a liquid as a blowing and filling medium, the preform being a cylindrical tube closed at one end and open at an opposing end defining a mouth, the apparatus comprising:
a mold for enclosing the preform so as to leave access to the mouth and neck of the preform that protrude from an upper surface of the mold;
an injection head configured to inject a liquid into the preform, the injection head being in sealing engagement with the upper surface of the mold around the mouth of the preform; and
a liquid collecting member defining a cavity surrounding the neck of the preform and configured to collect residual liquid that is present in the cavity between the injection head and the neck of the blown and liquid filled container, the liquid collecting member being suitable for collecting the residual liquid before opening of the mold and/or moving away the injection head from the mold, the liquid collecting member including a plurality of collecting channels that are operable to be in communication with the residual liquid, at least one of the collecting channels being inclined relative to a longitudinal axis passing by a center of the neck of the blown and liquid-filled container.

15. Apparatus according to claim 14, wherein the at least one collecting channel is a sucking channel.

16. Apparatus according to claim 14, wherein the number of collecting channels and/or their possible inclination relative to a longitudinal axis passing by a center of the neck of the blown and liquid filled container are adapted to the volume of the residual liquid to be collected.

17. An apparatus for blowing and filling a plastic container from a preform using a liquid as a blowing and filling medium, the preform being a cylindrical tube closed at one end and open at an opposing end defining a mouth with a dispensing opening, the apparatus comprising:
a mold for enclosing the preform so as to leave access to the mouth and a neck of the preform that protrudes from an upper surface of the mold;
an injection head configured to inject a liquid into the preform, the injection head being, in sealing engagement with the upper surface of the mold around the mouth of the preform and with the dispensing opening of the mouth of the perform;
a liquid collecting member defining a cavity surrounding the neck of the preform and configured to collect residual liquid that is present in the cavity between the injection head and the neck of the blown and liquid filled container, the liquid collecting member being suitable for collecting the residual liquid before opening of the mold and/or moving away the injection head from the mold, wherein the liquid collecting member comprises at least one collecting channel that is operable to be in communication with the residual liquid, and wherein the at least one collecting channel is provided in part in the mold and in the injection head.

18. Apparatus according to claim 17, wherein the at least one collecting channel has two parts one of which is provided in the mold and the other of which is provided in the injection head, the at least one collecting channel having an end that opens into the cavity located between the injection head and the neck of the blown and liquid-filled container.

19. Apparatus according to claim 18, wherein the open end of the at least one collecting channel is in an upper position relative to an opposite end of the at least one collecting channel.

20. Apparatus according to claim 17, wherein the mold comprises two halves, the at least one collecting channel being partially provided in at least one of the two mold halves.

* * * * *